US009797266B2

(12) United States Patent
Orieux et al.

(10) Patent No.: US 9,797,266 B2
(45) Date of Patent: Oct. 24, 2017

(54) TURBINE ENGINE GUIDE VANE ATTACHMENT ORIFICE CLOSER

(71) Applicant: SNECMA, Paris (FR)

(72) Inventors: Kaëlig Merwen Orieux, Fontaine le Port (FR); Thierry Georges Paul Papin, Varennes-Jarcy (FR)

(73) Assignee: SNECMA, Paris (FR)

( * ) Notice: Subject to any disclaimer, the term of this patent is extended or adjusted under 35 U.S.C. 154(b) by 323 days.

(21) Appl. No.: 14/728,108

(22) Filed: Jun. 2, 2015

(65) Prior Publication Data

US 2015/0345315 A1 Dec. 3, 2015

(30) Foreign Application Priority Data

Jun. 2, 2014 (FR) ...................................... 14 54953

(51) Int. Cl.
*F01D 9/04* (2006.01)
*F01D 9/02* (2006.01)
(Continued)

(52) U.S. Cl.
CPC ............... *F01D 9/02* (2013.01); *F01D 9/042* (2013.01); *F04D 29/542* (2013.01);
(Continued)

(58) Field of Classification Search
CPC .. F16B 21/04; F16B 37/14; F01D 9/02; F01D 9/042; F01D 25/24; F04D 29/542; F04D 29/644; F05D 2220/30; F05D 2220/36; F05D 2230/60; F05D 2240/12; F05D 2240/125; F05D 2260/31; Y02T 50/673
(Continued)

(56) References Cited

U.S. PATENT DOCUMENTS 1,400,535 A * 12/1921 Flannery ................... F22B 7/16
411/374
2,968,375 A * 1/1961 Avery, Sr. ................ B23Q 1/26
403/2
(Continued)

FOREIGN PATENT DOCUMENTS

EP 1 389 669 A1 2/2004
GB 2 454 291 A 5/2009
(Continued)

OTHER PUBLICATIONS

Preliminary Search Report as issued in French Application No. 1454953, dated Feb. 3, 2015.

*Primary Examiner* — Dwayne J White
*Assistant Examiner* — Sang K Kim
(74) *Attorney, Agent, or Firm* — Pillsbury Winthrop Shaw Pittman LLP

(57) ABSTRACT

A closer for an attachment orifice of an OGV in a turbine engine, the vane having a blade fixed to a root provided with attachment orifices, the closer including a cup adapted to be fixed in the attachment orifice of an OGV; a cylindrical shaped plug engaging in the cup, the plug including an upper face inclined relative to the ground plane of the plug; a guide adapted to position the plug on the cup by rotation into a working position, in which the upper face of the plug coincides with the surface level of the vane root; a blocking system to block the plug in the working position.

10 Claims, 3 Drawing Sheets

(51) Int. Cl.
*F16B 21/04* (2006.01)
*F16B 37/14* (2006.01)
*F04D 29/54* (2006.01)
*F04D 29/64* (2006.01)

(52) U.S. Cl.
CPC ............ *F04D 29/644* (2013.01); *F16B 21/04* (2013.01); *F16B 37/14* (2013.01); *F05D 2220/30* (2013.01); *F05D 2220/36* (2013.01); *F05D 2230/60* (2013.01); *F05D 2240/12* (2013.01); *F05D 2260/31* (2013.01); *Y02T 50/673* (2013.01)

(58) Field of Classification Search
USPC .......................... 411/372.5, 372.6, 373, 374
See application file for complete search history.

(56) References Cited

U.S. PATENT DOCUMENTS

| | | | | |
|---|---|---|---|---|
| 4,413,374 A * | 11/1983 | Ferdinand | ............ | A47B 95/02 16/441 |
| 4,964,594 A * | 10/1990 | Webb | ............ | B64C 1/12 244/129.3 |
| 5,112,175 A * | 5/1992 | Wilkening | ............ | F16B 37/14 411/372.5 |
| 5,788,442 A * | 8/1998 | Eder | ............ | F16B 37/14 411/372 |
| 5,988,966 A * | 11/1999 | Chen | ............ | F16B 37/14 411/372 |
| 6,910,355 B2 * | 6/2005 | Swanson | ............ | F16B 41/005 411/374 |
| 7,946,013 B2 * | 5/2011 | Kumagai | ............ | B25B 27/00 29/255 |
| 8,672,623 B2 * | 3/2014 | Harper | ............ | F01D 9/042 415/209.2 |
| 8,870,508 B2 * | 10/2014 | Hsu | ............ | F16B 37/14 411/372.5 |
| 9,290,276 B2 * | 3/2016 | Watanabe | ............ | B64D 45/02 |
| 9,422,821 B2 * | 8/2016 | Hyatt | ............ | F01D 9/042 |
| 2005/0095081 A1 * | 5/2005 | Tu | ............ | F16B 37/14 411/372.6 |
| 2013/0052004 A1 * | 2/2013 | Stilin | ............ | F01D 9/042 415/211.2 |

FOREIGN PATENT DOCUMENTS

| | | |
|---|---|---|
| JP | H05-019624 U | 3/1993 |
| JP | 2001-355596 A | 12/2001 |

* cited by examiner

TURBINE ENGINE GUIDE VANE ATTACHMENT ORIFICE CLOSER

CROSS-REFERENCE TO RELATED APPLICATIONS

This application claims priority to French Patent Application No. 1454953, filed Jun. 2, 2014, the entire content of which is incorporated herein by reference in its entirety.

FIELD

This invention relates to the field of turbine engine guide vanes and more particularly outlet guide vanes.

BACKGROUND

FIG. 1 diagrammatically shows a by-pass turbine engine for aeronautical propulsion. It comprises a fan 10 creating an air stream of which the central part, called the core engine flow $F_p$ or primary flow, is injected into a, compressor 12 that feeds a turbine 14 that drives the fan.

The peripheral part of the air stream called the fan flow $F_s$, or secondary flow, is released into the atmosphere to supply part of the thrust of the turbine engine 1 after passing through a ring of fixed blades arranged downstream from the fan. This ring called the Outlet Guide Vanes (OGVs) 20 guides the air flow at the outlet from the fan while minimising losses. A reduction of 0.1% of losses (for example pressure reduction) in the outlet guide vane can increase the overall efficiency of the fan and outlet guide vane assembly by 0.2 points, the correspondence between losses and efficiency obviously depending on the engine and the aerodynamic load of the associated fan.

Consequently, the air flow in the flow stream through the outlet guide vane should be optimised and losses should be minimised.

The vanes of the outlet guide vane 20 are fixed onto a hub 30 by means of bolts. FIG. 2 shows a sectional view of a vane root of an outlet guide vane at its attachment to the hub 30 of the turbine engine. As shown, the vane root comprises attachment orifices 22 that mechanically connect the vane to the hub 30 through screwing system 23. The attachment orifices 22 are formed from a first through reaming 22a and from a second blind reaming 22b with a larger diameter, opening up at the upper face of the root, the diameter of which is adapted to allow the head 24 of the screwing system 23 to pass through. A ring or a cup 25 may be placed in the blind reaming 22b between the screwing system 23 and the root 21 to prevent hammering or marking of parts.

These reamings create stop faces for the air flow causing aerodynamic turbulence of the air flow in the outlet guide vane air stream.

To overcome this problem, it has been proposed to fill in these reamings (once the vane is in position) using a silicone-based compound known as RTV (Room Temperature Vulcanizing) silicone to eliminate all stop faces in the guide vane flow stream and particularly at the vane roots.

Use of this silicone-based compound requires a long drying time and consequently increases the duration of assembly operations. The use of silicone for filling the attachment orifices also increases the disassembly time, particularly during maintenance operations because the compound has to be removed and orifices have to be cleaned before reassembly.

SUMMARY

In this context, an aspect of the invention aims at providing an attachment orifice closer to fill in these attachment orifices after assembly of the vanes of the outlet guide vane and avoid the need to use a polymer-based filling compound, thus reducing assembly and disassembly operation times for vanes in an outlet guide vane of a turbine engine, while guaranteeing continuity of the flow stream through the outlet guide vane.

To achieve this, an embodiment of the invention relates to a closer for an attachment orifice of an OGV in a turbine engine fan, the vane having a blade fixed to a root provided with attachment orifices, the closer comprising:
 a cup adapted to be fixed in the attachment orifice of an OGV;
 a cylindrical shaped plug engaging in the cup, the plug comprising an upper face inclined relative to the ground plane of the plug;
 a guide adapted to position the plug on the cup by rotation into a position called the working position, in which the upper face of the plug coincides with the surface level of the vane root;
 a blocking system to block the plug in the working position.

The closer according to an embodiment of the invention thus eliminates the need to use a silicone-based compound to fill in the attachment orifices while maintaining continuity of the flow stream through the OGV.

The closer according to an embodiment of the invention also has the benefit that it comprises a blocking system using an obstacle in order to assure that the plug in position cannot come out during flight.

The closer according to an embodiment of the invention may also have one or several of the following characteristics, considered individually or in any technically possible combination:
 the cup comprises positioning pins for positioning the cup in the vane attachment orifice of an OGV;
 the positioning pins form a foolproofing device;
 the guide is adapted to position the plug in the working position, by rotation;
 the guide is adapted to position the plug by a quarter of a turn;
 the guide is formed by a stud formed on the plug engaging in a slot formed on the cup;
 the plug comprises a cavity, as a screw mark, on its upper face for positioning a tool;
 the blocking system is formed by a material overthickness on the plug engaging in a recess formed on the cup;
 the blocking system is formed by a peripheral rim formed around the lower part of the plug engaging in a peripheral recess formed on the cup.

Another aspect of the invention relates to an OGV of a turbine engine fan comprising a hub and a plurality of vanes comprising a blade and a root, the root having orifices for attachment of the vanes onto the hub, the OGV comprising closers according to an embodiment of the invention to fill in the attachment orifices of the vane roots.

Another aspect of the invention relates to a turbine engine comprising a fan OGV according to an embodiment of the invention.

The invention will be better understood after reading the following description with reference to the figures, the list of which is given below.

DETAILED DESCRIPTION

Figure 3:
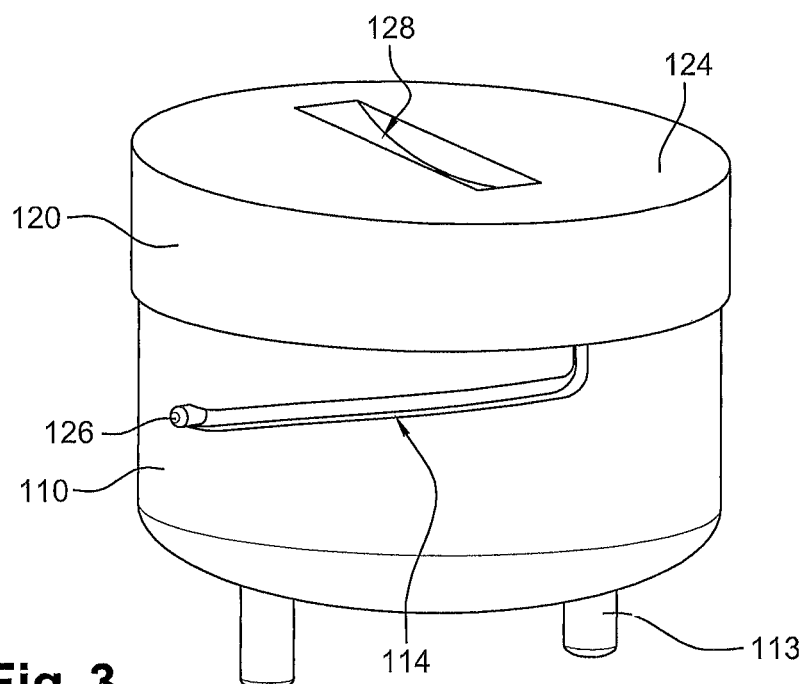
FIG. 3 shows a perspective view of a closer according to an embodiment of the invention housed in the attachment orifices of OGVs.
Figure 4:
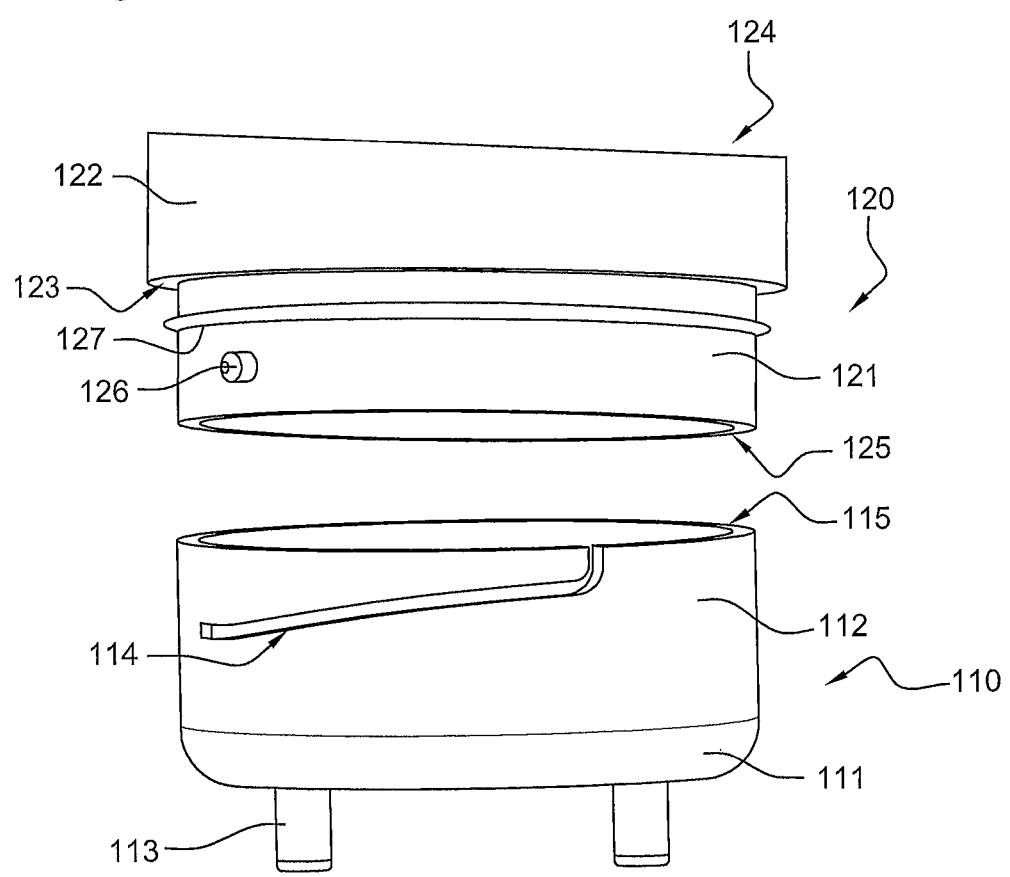
FIG. 4 is an exploded view of a closer according to an embodiment of the invention, housed in the attachment orifices of the OGVs.

With reference to FIGS. 3 and 4, the closer or closing arrangement 100 according to an embodiment of the invention will fill in the attachment orifices formed at the roots of the turbine engine OGVs that are necessary to fasten the OGV onto a hub.

The closer 100 is composed of two parts that can be removed individually; a cup 110 held in place at an attachment orifice of the vane root by the vane screwing system 23 (shown in FIG. 5) and a removable plug 120 adapted to engage in the cup 110.

The cup 110 has an annular-shaped base 111 and a peripheral wall 112 projecting from the base 111, along a direction perpendicular to the plane formed by the base 111. The base 111 has positioning components for example formed from two pins 113 that enable precise positioning of the cup 110 in the orifice 22 of the vane root 21. This is achieved by assuring that the orifice 22 is provided with two drillings into which the pins 113 of the cup 110 will fit. It is also envisaged that pins 113 may be made with a different geometry or a different size in order to form a foolproofing device to facilitate positioning of the cup 110 in the orifice of the OGV root 21. The two pins 113 also provide preliminary retention of the cup 110 in the orifice 22 of the vane root 21 before the screwing system 23 is put in position. The screwing system includes one or more screws.

Figure 1:
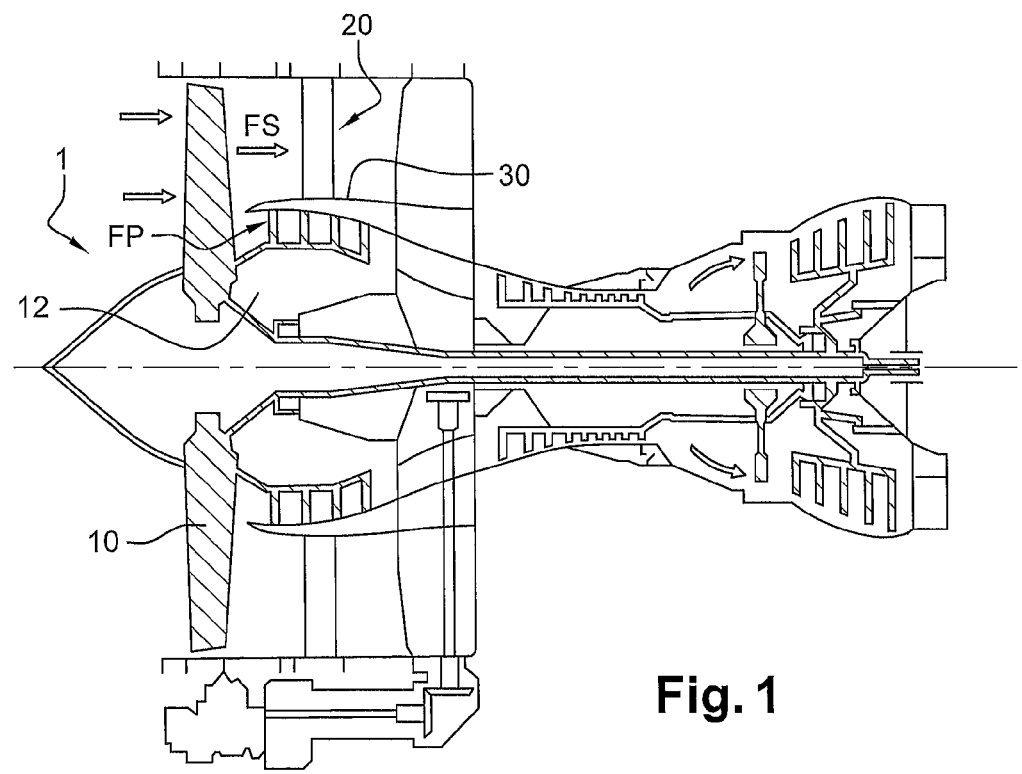
FIG. 1 already described, diagrammatically shows a by-pass turbine engine.
Figure 2:
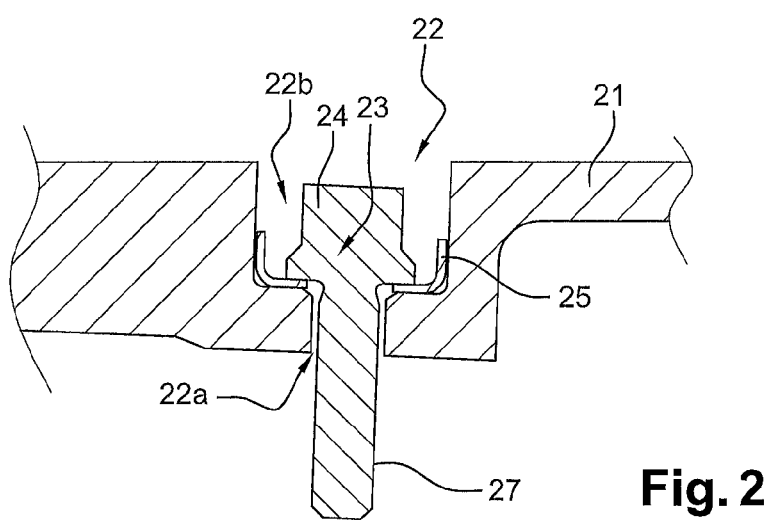
FIG. 2, already described, shows a sectional view of a root of an OGV at a vane attachment orifice.

The central part of the annular base 111 allows passage of screwing system and particularly the threaded rod 27 of the screwing system 23 described with reference to FIG. 2. The base 111 of the cup 110 will hold the head 24 of the screwing system 23 in contact in order to fix the OGV onto the hub. Thus, the cup 110 of the closer 100 according to an embodiment of the invention is fixed in position in the orifice 22 of the vane root when the vane is assembled on the hub.

The peripheral wall 112 of the cup 110 is also annular in shape and it has a slot 114 or possibly two diametrically opposite slots extending over part of the peripheral wall 112 and opening up at the upper face 115 of the cup. The slot 114 forms the female part of a guide or guiding system that guides the plug so that it is well positioned on the cup 110 but also so that it is correctly oriented relative to the flow stream through the OGV.

The plug 120 of the closer 100 has a first part 121 that is cylindrical in shape located in the lower part and a second part 122 that is also cylindrical in shape and has an outside diameter larger than the first part 121 located in the upper part, the second part 122 covering the lower part 121 of the cover 120. The cover 120 has a peripheral shoulder 123 extending around the periphery and forming the separation between the two parts 121, 122 of the cover 120. The shoulder 123 will come into contact with the upper surface 115 of the cup 110 when the plug 120 is assembled on the cup 110.

The plug 120 also comprises a stud 126 located in the lower part 121 forming the male part of the guide. Thus, the dimensions of the stud 126 are adapted such that the stud slides freely inside the slot 114 in the cup 110. It will be appreciated that the plug may comprise two diametrically opposite studs if the cup has two slots 114. Thus, the movement to position the plug 120 is imposed by the shape of the slot 114. Beneficially, the shape of the slot 114 is adapted so that the plug cab be locked by making an 90° rotation, in other words a quarter of a turn.

There is a cavity 128 at the upper face 124 of the plug, into which a tool matching the shape of the cavity 128 (for example a flat screwdriver) can be inserted to facilitate rotation of the plug 120.

Beneficially, the upper face 124 of the plug 120 is inclined relative to the ground plane of the plug formed by the lower face 125 and therefore also relative to the plane formed by the base 111 of the cup 110.

The inclination of the upper face 125 is determined such that when it is in the working position on the cup 110, the upper face 124 of the plug 120 is flush with the upper surface 26 of the vane root 21 and coincides with the inclination of the surface of the vane root so as to form a smooth continuous surface.

Figure 5:
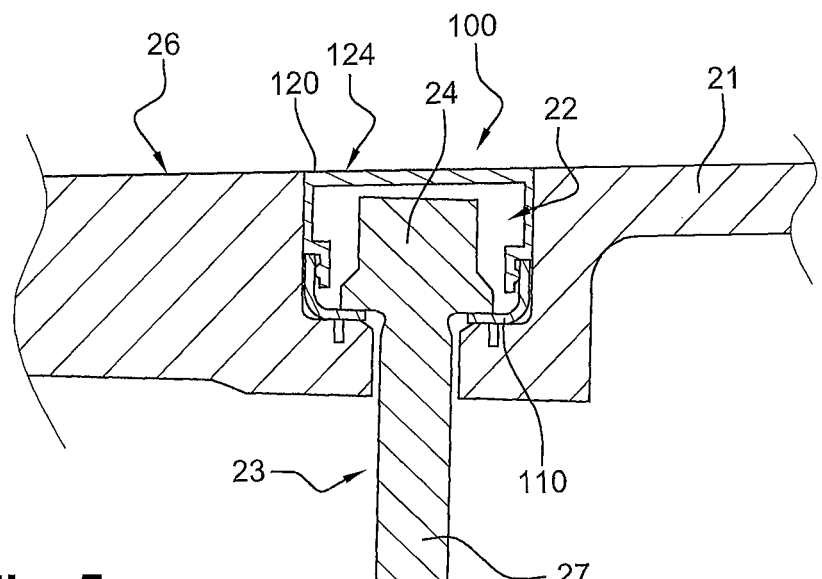
FIG. 5 shows a partial sectional view of a root of an OGV of a turbine engine at an attachment orifice with the closer according to an embodiment of the invention in position.

FIG. 5 shows the closer 100 according to an embodiment of the invention in position in an attachment orifice 22 of the vane 21 on a hub (not shown). Thus, with the closer according to an embodiment of the invention, the attachment orifices no longer form stop faces creating turbulence in the flow stream through the OGV.

It will be appreciated that the position of the pins 113 and the shape and position of the slot 114 on the peripheral wall of the cup are determined as a function of the desired inclination of the plug when the plug is in its working position.

Positioning of the plug 120 on the cup 110 in its working position was described mainly by making a ¼ turn rotation, however it would also be possible to be able to lock the plug 120 with any angle of rotation. The shape of the slot 114 will then be adapted accordingly so that the determined rotation can be made.

Figure 6:
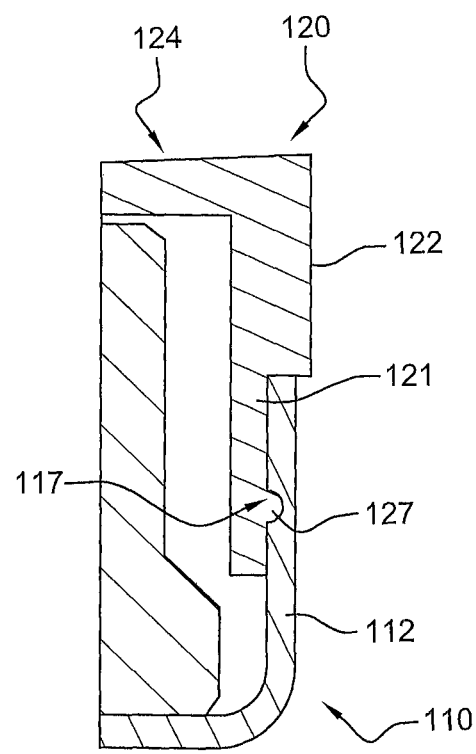
FIG. 6 shows a partial sectional view of the closer according to an embodiment of the invention.

The plug 120 comprises an overthickness of material, for example in the form of a rim 127 located at its first part 121, so that the plug 120 can be held and blocked in its working position thus preventing it from getting lost, or its position being modified in flight such that the plug would project above the upper surface 26 of the root. The rim 127 is beneficially continuous and arranged around the entire periphery of the plug 120. However, it would also be possible to make several rim portions (and beneficially at least two) distributed around the periphery of the plug 120. The rim 127 is adapted so that it can be inserted into a groove (shown in FIG. 6) formed on the inner face of the peripheral wall 112 of the cup 110 when the plug reaches its working position. Consequently, the upper face of the cup 110 may be sufficiently elastic so that the rim 127 can be inserted.

The invention claimed is:

1. A closer for an attachment orifice of an outlet guide vane (OGV) in a turbine engine fan, said outlet guide vane including a blade fixed to a root provided with attachment orifices, the closer comprising:

a cup configured to be fixed in an attachment orifice of the outlet guide vane;

a cylindrical shaped plug engaging in said cup, said cylindrical shaped plug comprising an upper face inclined relative to a ground plane of said cylindrical shaped plug;

a guide adapted to position said cylindrical shaped plug on said cup by rotation into a working position, in which the upper face of said cylindrical shaped plug coincides with a surface level of the vane root;

a blocking system configured to block the cylindrical shaped plug in said working position.

2. The closer for an attachment orifice of an OGV in a turbine engine fan according to claim 1, wherein said cup comprises positioning components for positioning said cup in the vane attachment orifice.

3. The closer for an attachment orifice of an OGV in a turbine engine fan according to claim 2, wherein the positioning components form a foolproofing device.

4. The closer for an attachment orifice of an OGV in a turbine engine according to claim 1, wherein said guide is configured to position said cylindrical shaped plug by a quarter of a turn.

5. The closer for an attachment orifice of an OGV in a turbine engine according to claim 1, wherein said guide is formed by a stud formed on said cylindrical shaped plug engaging in a slot formed on said cup.

6. The closer for an attachment orifice of an OGV in a turbine engine according to claim 1, wherein the cylindrical shaped plug comprises a cavity on the upper face for positioning a tool.

7. The closer for an attachment orifice of an OGV in a turbine engine according to claim 1, wherein the blocking system is formed by a material overthickness on said cylindrical shaped plug engaging in a recess formed on the cup.

8. The closer for an attachment orifice of an OGV in a turbine engine according to claim 1, wherein the blocking system is formed by a peripheral rim formed around a lower part of the plug engaging in a peripheral recess formed on the cup.

9. An outlet guide vane (OGV) of a turbine engine fan comprising a hub and a plurality of vanes comprising a blade and a root, said root comprising orifices for attachment of the vanes onto said hub, wherein said OGV comprises a plurality of closers according to claim 1 to fill in the attachment orifices of the vane roots.

10. A turbine engine comprising an outlet guide vane (OGV) according to claim 9.

* * * * *